United States Patent [19]

Higuchi

[11] Patent Number: 4,743,192
[45] Date of Patent: May 10, 1988

[54] RESIN INJECTION METAL MOLD UNIT

[75] Inventor: Masahiro Higuchi, Tama, Japan

[73] Assignee: Sankyo Oilless Industry, Inc., Tokyo, Japan

[21] Appl. No.: 60,885

[22] Filed: Jun. 12, 1987

[30] Foreign Application Priority Data

Dec. 16, 1986 [JP] Japan .................... 61-192443[U]

[51] Int. Cl.[4] .................... B29C 45/66; B29C 45/73
[52] U.S. Cl. .................... 425/192 R; 249/79;
249/102; 269/93; 269/99; 425/195; 425/547;
425/552; 425/451.9
[58] Field of Search .................. 249/79, 102; 425/190,
425/192 R, 193, 195, 547, 552, 406, 407, 451.9,
810, DIG. 5, DIG. 106; 100/918; 269/93, 99,
100

[56] References Cited

U.S. PATENT DOCUMENTS

| 3,194,548 | 7/1965 | Zwick | 269/93 |
| 3,932,097 | 1/1976 | Press | 425/407 |
| 3,947,204 | 3/1976 | Ayres et al. | 425/406 |
| 4,362,291 | 12/1982 | Fuke et al. | 249/144 |
| 4,482,515 | 11/1984 | Buhler et al. | 264/102 |
| 4,500,275 | 2/1985 | Ruhl | 425/192 R |

FOREIGN PATENT DOCUMENTS 2163331 6/1973 Fed. Rep. of Germany .
2411673 9/1975 Fed. Rep. of Germany ........ 249/79
150013 8/1981 German Democratic Rep. .

Primary Examiner—Jay H. Woo
Assistant Examiner—James C. Housel
Attorney, Agent, or Firm—Armstrong, Nikaido, Marmelstein & Kubovcik

[57] ABSTRACT

A resin injection metal mold unit comprising, in combination, a metal mold consisting of a cavity section and a core section, and stationary and movable metal mold supporting members for releasably holding the metal mold sections in the opposing relationship. Each supporting member has a plurality of clamping members for engaging an associated mold section. Each clamping member has a clamping slant in the complementary relationship with the counter slant chamfer of the mold section. Such members are slidably attached to an associated supporting member so as to move close and apart from the mold section. When a mold section is fixed to an associated supporting member, the clamping members are brought in contact with the mold section with their clamping slants closely fitting the counter chamfer slants of the mold section, and then clamping members are fixed to the supporting member by driving associated bolts, thereby pushing and holding the mold section against the supporting member. When the mold section is removed from the supporting member, the clamping members are loosened and brought away from the mold section, thereby releasing the mold section.

3 Claims, 1 Drawing Sheet

RESIN INJECTION METAL MOLD UNIT

BACKGROUND OF THE INVENTION

1. Field of the Invention

The present invention relates to a metal mold unit for use in injection molding of synthetic resin.

2. Related Art

FIG. 3 shows a conventional metal mold unit for injectionmolding synthetic resin as comprising, in combination, a metal mold 1 consisting of a cavity 1a and a core 1b, a stationary metal mold supporting member 2 and a movable metal mold supporting member 3. These cavity 1a and core 1b are releasably fixed to the stationary and movable metal mold supporting member 2 and 3, respectively. The whole assembly is attached to an injection molding machine (not shown), and then the opposing metal mold sections 1a and 1b are made to open and close, thereby permitting injection molding of resin material and removal of rein products.

As shown, each metal mold section 1 has a fluid channel 5.

A heating fluid is made to flow in the fluid channel to control the mold temperature in use.

The conventional metal mold unit is so complicated in structure, particularly in attachment of metal sections to the stationary and movable supporting members that replacement of a new metal mold for shaping a different resin article would involve much man-hour, accordingly causing poor operating efficiency.

In an attempt to avoid this problem, a metal mold is integrally connected to a holder as a whole unit, and when a metal mold is changed in an injection molding machine, a metal mold unit having a desired metal mold intergrally connected to a holder is put in place. In this connection disadvantageously a metal mold holder, which, otherwise, could be repeatedly used for different metal molds, must be made for each and every metal mold. This involves much expense in making metal mold units.

SUMMARY OF THE INVENTION

In an attempt to solve the problem involved in the conventional metal mold unit, one object of the present invention is to provide a metal mold unit which permits common use of metal mold supporting members for different metal molds, and at the same time, easy and quick attachment and removal of a metal mold from the supporting members even if they are fixed to an injection molding machine, thus attaining a substantial reduction of mold manufacturing cost, and improving the workability of injection molding.

To attain this object, an injection mold unit according to the present invention comprises, in combination, a metal mold consisting of a cavity and a core each having a mold temperature controlling fluid channel, a stationary metal mold supporting member and a movable metal mold supporting member, these members being adapted to releasably hold the cavity and core of the metal mold in the opposing relationship, each supporting member being equipped with a plurality of slidable clamping members or solids for catching an associated mold section by at least two selected opposing points, each clamping solid having first, a clamping slant in the complementary relationship with the counter chamfer slant of the mold section, and second, a fluid channel opening at the surface of the clamping slant, so that the fluid channel of each clamping solid may be put in communication with the mold temperature controlling fluid channel of the metal mold when the metal mold is fixed to the stationary and movable supporting members.

In an injection metal mold unit according to a preferred embodiment of the present invention, the stationary and movable supporting members are in the form of relatively thick plate, each plate having an elongated slot at either end for slidably containing a nut. Each clamping solid has a reentrancy at the bottom, a bolt extending through the solid body and appearing from the bottom of the solid, a coil spring around the bolt in the reentrancy of the solid. Each clamping solid may be fixed to an associated supporting member with its bolt threadly engaged with the nut in the elongated slot of the supporting plate while the coil spring is yieldingly compressed.

In use, the core (or cavity) of a metal mold is put on the stationary (or movable) supporting member with the slant chamfers of the mold section facing the slant surfaces of the adjacent clamping solids, and then the mold section is pushed against the supporting member by driving bolts in the clamping solids, and finally the mold section is fixed to the supporting member with the clamping solids. In removing the mold section from the supporting member first, the fastening bolts are loosened and the clamping solids are moved apart from the mold section. Metal molds of somewhat different thicknesses can be fixed to the supporting members; thanks to the coil spring each clamping solid automatically rises above an associated supporting member with the increase of thickness of a mold section to be fixed.

As described above, an injection mold unit according to the present invention comprises a stationary metal mold supporting member and a movable metal mold supporting member, each having a plurality of clamping solids for catching an associated mold section by the diametrically opposite chamfers thereof. Each solid has a clamping slant in the complementary relationship with the counter slant chamfer of the mold section. Such clamping solids are attached slidably to each supporting member so as to move close to and apart from the cavity and core of a metal mold. This arrangement permits the common use of a pair of metal mold supporting members for different metal molds. Thus, the cost involved for manufacturing a metal mold unit is reduced by about 40 percent, compared with the cost for manufacturing a conventional one, which is composed of an integral connection of a metal mold and opposite supporting members, hence requiring the exclusive use of the supporting members. Also, each clamping solid has a heating fluid channel opening at the surface of the clamping slant. The fluid channel of each solid may be automatically put in communication with the mold temperature controlling fluid channel made in the metal mold when the metal mold is fixed to the supporting members with such clamping solids. Advantageously, these permit the quick and easy replacement of metal molds in a resin injection molding machine.

Other objects and advantages of the present invention will be better understood from the following description taken in conjunction with the accompanying drawings:

PREFERRED EMBODIMENT

Figure 1:
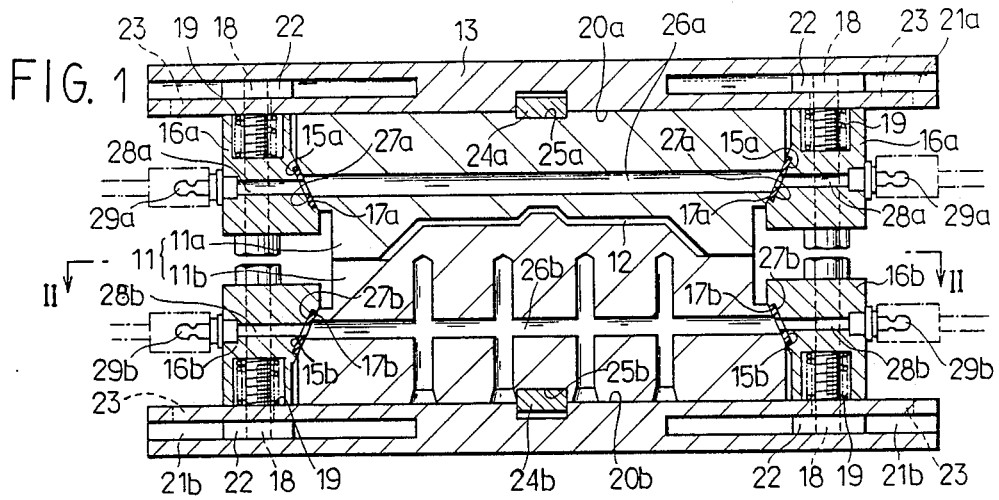
FIG. 1 is a longitudinal sectional view of a metal mold unit according to one embodiment of the present invention.
Figure 2:
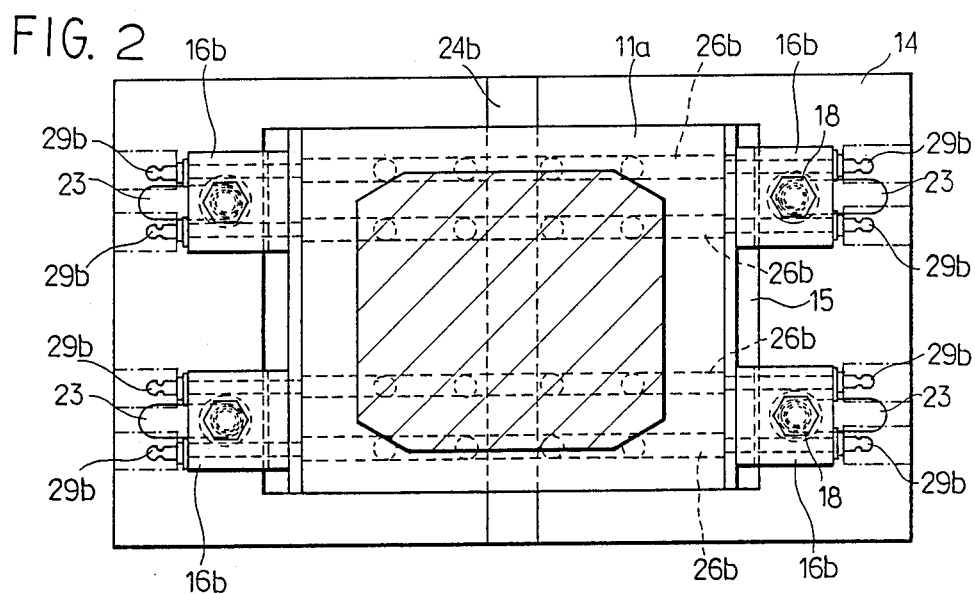
FIG. 2 is a plan view of the metal mold unit as viewed in the direction indicated by the line II—II in FIG. 1.
Figure 3:
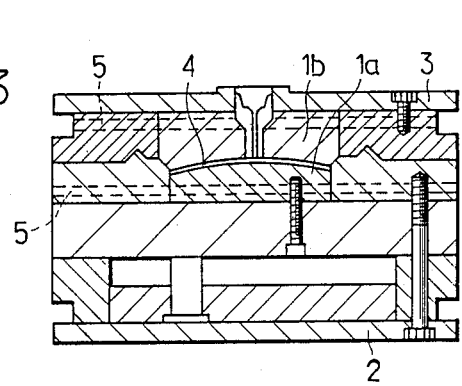
FIG. 3 is a longitudinal sectional view of a conventional metal mold unit.

FIGS. 1 and 2 show a metal mold unit according to the present invention. In these drawings, a metal mold 11 is shown as comprising a cavity section 11a and a core section 11b, together defining mold space 12 therebetween. The cavity section 11a is fixed to a movable supporting member 13 whereas the core section 11b is fixed to a stationary supporting member 14.

As shown, the cavity section 11a has two chamfers 15a at the diametrically opposite edges thereof. Two clamping members 16a are slidably attached to the supporting member 13 on either side of the cavity section 11a.

Each member has a clamping slant 17a in the complementary relationship with the counter chamfer slant 15a of the cavity section 11a.

Likewise, the core section 11b has two chamfers 15b at the diametrically opposite edges thereof. Two clamping members 16b are slidably attached to the supporting member 14 on either side of the core section 11b.

Each member 16b has a clamping slant 17b in the complementary relationship with the counter chamfer slant 17b of the core section 11b.

The clamping members 16a and 16b are releasably fixed to the movable and stationary supporting members 13 and 14 by bolts 18 respectively.

As shown, a coil spring 19 is wound around each bolt 18 between the supporting member and the solid body. Thus, the clamping members 16a may be raised from the movable supporting member 13 under the resilient influence of the coil spring 19 when associated bolts 18 are loosened. Likewise, the members 16b may be raised from the stationary supporting member 14 under the influence of the coil spring 19 when associated bolts 18 are loosened. As shown, each supporting member has a longitudinal slot 21a or 21b made parallel to the surface of the supporting member at either end thereof, and a movable nut 22 is slidably contained in each longitudinal slot 21a or 21b. Each longitudinal slot is opened through a longitudinal hole 23 formed in inner side of the supporting member 13. And each bolt 18 is associated with the movable nut 22 through the longitudinal hole 23. Each clamping solid is attached to the supporting member with a bolt 18 and nut 22 accommodated in the longitudinal slot 21a or 21b. As shown in FIG. 1, the bearing surface 20a or 20b of each supporting member has a key 24a or 24b embedded in the center thereof, and the back side of each mold section has a key groove 25a or 25b made at the center. The mold sections 11a and 11b are put on the movable and stationary supporting members with keys 24a and 24b inserted into these grooves 25a and 25b.

Temperature controlling channels 26a and 26b are made in the cavity section 11a and core section 11b of a metal mold, and these channels open at the chamfers 15a and 15b of the mold sections. On the other hand channels 28a and 28b are made in the clamping members 16a and 16b, opening at their clamping slant surfaces 17a and 17b. Gasket grooves are made around the opening of these channels, and gaskets 27a and 27b are fitted in the gasket grooves. Pipe connectors 29a and 29b are pushed in the rear openings of the channels of the clamping solids.

In use, the movable supporting member 13 is put on and fixed to the movable part of an injection molding machine (not shown) whereas the stationary supporting member 14 is put on and fixed to the stationary part of the injection molding machine. Then, the cavity and core of a metal mold is put on the supporting members with their keys 24a and 24b fitted in the key grooves 25a and 25b. The clamping members 16a are moved close to the cavity section 11a until their clamping slants 15a have been brought in contact with the counter chamfer slants 17a of the cavity section 11a, and then the clamping members 16a, sandwiching the cavity section 11a therebetween, push the cavity section 11a against the movable supporting member 13 by driving the bolts 18, which are threadedly engaged with the nuts 22 in the elongated slots 21a.

Likewise, after putting the core 11b on the stationary supporting member 14, the clamping solids 16b are moved close to the core section 11b until their clamping slants 15b have been brought in contact with the counter chamfer slants 17b of the core section 11b, and then the clamping members 16b, sandwiching the core section 11b therebetween, push the core 11b against the stationary supporting member 14 by driving bolts 18, which are threadedly engaged with the nuts 22 in the elongated slots 21b.

In removing the cavity and core of the metal mold from the movable and stationary supporting members, first, the bolts 18 are loosened, thereby allowing the clamping members 16a and 16b to rise under the resilient influence of the coil springs 19 and releasing the cavity section 11a and the core section 11b from the movable and stationary supporting members 13 and 14. Then, the clamping members 16a and 16b are moved along the longitudinal slots 23 away from the mold sections 11a and 11b. Then, the mold sections 11a and 11b are released.

What is claimed is:

1. Resin injection metal mold unit comprising, in combination, a metal mold consisting of a first mold section defining a cavity and a second mold section defining a core, each section having chamfers at at least two selected opposite points and a mold temperature controlling fluid channel extending between said at least two points, a stationary metal mold supporting member and a movable metal mold supporting member, said members being adapted to releasably hold the cavity defining section and the core defining section of the metal mold in opposing relationship, each supporting member having a plurality of slidable clamping members for engaging an associated mold section by said at least two selected opposite points, each clamping member having a clamping slant in complementary relationship with a respective chamfer of the associated mold section, and a fluid channel opening at the surface of the clamping slant, such that the fluid channel of each clamping member is put in communication with the mold temperature controlling fluid channel of each mold section of the metal mold when the metal mold is fixed to the stationary and movable supporting members with the clamping members.

2. Resin injection metal mold unit as claimed in claim 1, wherein each of said stationary and movable supporting members is a relatively thick plate, each plate having an elongated slot at opposite ends for slidably holding a nut, each of said clamping members having a recess at its bottom, a bolt extending through the clamping member and outwardly from the bottom of the clamping member, a coil spring around the bolt in the recess of the clamping member, each clamping member being fixed to an associated supporting member with a respective one of said bolts threadedly engaged with the nut contained in the slot, thereby compressing the coil spring.

3. Resin injection metal mold unit as claimed in claim 2, wherein said stationary and movable supporting members have keys embedded therein whereas said cavity defining section and said core defining section of the metal mold have back surfaces abutting said supporting members, said back surfaces having key grooves formed therein, said key grooves receiving said keys of the supporting members.

* * * * *